United States Patent
Chen et al.

[19]

[11] Patent Number: 6,081,437
[45] Date of Patent: Jun. 27, 2000

[54] LOAD BALANCER FOR A POWER SUPPLYING SYSTEM

[75] Inventors: Tsung-Chun Chen; Yung-Hsin Huang, both of Taipei Hsien, Taiwan

[73] Assignee: Shin Jiuh Corp., Taipei Hsien, Taiwan

[21] Appl. No.: 09/205,131

[22] Filed: Dec. 3, 1998

[51] Int. Cl.[7] .................................................. H02M 7/00
[52] U.S. Cl. ................... 363/70; 363/65; 307/82
[58] Field of Search ................. 363/70, 69, 67, 363/65; 307/82, 58

[56] References Cited

U.S. PATENT DOCUMENTS

| | | | |
|---|---|---|---|
| 3,974,397 | 8/1976 | Killough, Jr. ............................... | 307/82 |
| 4,833,582 | 5/1989 | Kupka ....................................... | 363/21 |
| 4,956,762 | 9/1990 | Loveness et al. .......................... | 363/65 |
| 5,319,536 | 6/1994 | Malik ........................................ | 363/65 |
| 5,576,940 | 11/1996 | Steigerwald et al. ..................... | 363/17 |
| 5,610,452 | 3/1997 | Shimer et al. ............................. | 307/89 |
| 5,768,117 | 6/1998 | Takahashi et al. ........................ | 363/65 |
| 5,905,645 | 5/1999 | Cross ........................................ | 363/65 |

*Primary Examiner*—Adolf Deneke Berhane
*Attorney, Agent, or Firm*—Sheridan Ross P.C.

[57] ABSTRACT

A load balancer is to be used in a power supplying system which includes at least two power supplying units that are connected in parallel to supply power concurrently to operate an electrical load. The load balancer includes at least two sensors, each of which is adapted to generate an ac sensor output corresponding to power output of a respective one of the power supplying units. Each of at least two rectifying and filtering circuits rectifies and filters the ac sensor output of a respective one of the sensors so as to obtain a corresponding dc sensor output. A microprocessor receives the dc sensor outputs from the rectifying and filtering circuits, and calculates an average input value therefrom that corresponds to a balanced power output for the power supplying units. The microprocessor compares each of the dc sensor outputs with the average input value, and when one of the dc sensor outputs is larger than the average input value, indicating a condition in that the power output of one of the power supplying units is higher than the balanced power output, the microprocessor generates a load adjustment signal to control the power supplying unit with the higher power output so as to decrease its power output to the balanced power output.

3 Claims, 3 Drawing Sheets

LOAD BALANCER FOR A POWER SUPPLYING SYSTEM

BACKGROUND OF THE INVENTION

1. Field of the Invention

The invention relates to a power supplying system, more particularly to a load balancer that permits two or more power supplying units of a power supplying system to supply the same amount of power concurrently to operate the same electrical load.

2. Description of the Related Art

Referring to FIG. 1, a conventional power supplying system 1 includes two power supplying units 10, 11 that are connected in parallel to supply power concurrently to operate the same electrical load 12, such as a desktop computer or a notebook computer. However, in the conventional power supplying system 1, the power that is supplied to the electrical load 12 cannot be evenly divided between the power supplying units 10, 11. That is, for a 100-watt electrical load 12, one of the power supplying units 10, 11 might provide a higher power output, such as 80 watts, while the other one of the power supplying units 10, 11 might provide a lower power output, such as 20 watts. Under this condition, the service life of the power supplying unit that provides the higher power output will be shortened, thereby leading to lower reliability. This problem is aggravated when the power supplying system 1 incorporates a larger number of power supplying units.

FIG. 2 illustrates another conventional power supplying system 2 with a load balancing capability. The power supplying system 2 includes two power supplying units 20, 21 that are connected in parallel to supply power concurrently to operate the same electrical load 22. Each of the power supplying units 20, 21 incorporates a resistor (RCS) for detecting the power output of the corresponding one of the power supplying units 20, 21. In the event that one of the power supplying units 20, 21 provides a lower power output than the other one of the power supplying units 20, 21, a load adjusting circuit 23 controls a pulse width modulation (PWM) control circuit 24 that is connected to said one of the power supplying units 20, 21 to increase the power output of the latter until the power outputs of the power supplying units 20, 21 become equal to a balanced power output. For example, assuming that the power supplying units 20, 21 initially provide power outputs of 80 watts and 20 watts, respectively, to a 100-watt electrical load 22, one of the load adjusting circuits 23 will control the corresponding PWM control circuit 24 to increase the power output of the power supplying unit 21 to 50 watts. The power output of the power supplying unit 20 will drop simultaneously to 50 watts at this time.

However, even though the conventional power supplying system 2 incorporates a load balancing capability, it suffers from the following drawbacks:

1. The amplifiers 230 of the load adjusting circuits 23 have an offset voltage limitation. That is, the voltage across input terminals X, Y of the amplifiers 230, i.e. the voltage across the resistor (RCS) of the corresponding power supplying unit 20, 21, must be larger than a predetermined limit in order for the amplifiers 230 to operate. As such, the load balancing capability is only available for large power load conditions.
2. Since the resistor (RCS) is used to detect the output power of the corresponding one of the power supplying units 20, 21, power waste occurs due to the power that is absorbed by the resistor (RCS) whenever the corresponding one of the power supplying units 20, 21 provides a power output to the electrical load 22. For example, assuming that each of the power supplying units 20, 21 provides outputs of +5V/40A, +3.3V/20A, and +12V/16A, and that the resistance of the resistor (RCS) is 5 m, the power that is absorbed by the resistor (RCS) is $P = I^2 R = (40+20+16)^2 \times 5 = 28.8 W$ 3. Since the resistor (RCS) is generally formed from a metal material, the resistance thereof is easily affected by ambient temperature. Thus, the power supplying system 2 has relatively poor temperature stability.
4. Since the resistor (RCS) is in use, a voltage drop is present across the resistor (RCS) whenever the corresponding one of the power supplying units 20, 21 provides a power output to the electrical load 22. For example, assuming that each of the power supplying units 20, 21 provides outputs of +5V/40A, +3.3V/20A, and +12V/16A, and that the resistance of the resistor (RCS) is 5 m, the voltage drop across the resistor (RCS) is $V = IR = (40+20+16) \times 5 = 0.38 V$ 5. Good grounding is necessary in the power supplying system 2. Otherwise, severe noise can affect load adjustment of the power supplying units 20, 21, and can result in erroneous operation of the power supplying system 2.
6. In the conventional power supplying system 2, load adjustment is performed by increasing the power output of the power supplying unit 20, 21 that initially provides a lower power output as compared to the other power supplying unit 20, 21. In the event of abnormal operating conditions, the load adjustment as such can easily lead to overvoltage at the output of the power supplying system 2, and can result in damage to internal components of the electrical load 22.
7. Each of the power supplying units 20, 21 is associated with a respective load adjusting circuit 23. Each load adjusting circuit 23 incorporates a relatively large number of discrete components that lead to a relatively complicated construction. This can result in a substantial increase in the cost of the power supplying system 2, especially when the power supplying system 2 incorporates a greater number of power supplying units.

SUMMARY OF THE INVENTION

Therefore, the object of the present invention is to provide a microprocessor-based load balancer that permits two or more power supplying units of a power supplying system to supply the same amount of power concurrently to operate the same electrical load, and that is capable of overcoming the aforementioned drawbacks commonly associated with the prior art.

Accordingly, the load balancer of the present invention is adapted for use in a power supplying system which includes at least two power supplying units that are connected in parallel to supply power concurrently to operate an electrical load. The load balancer comprises at least two sensors, at least two rectifying and filtering circuits, and a microprocessor.

Each of the sensors is adapted to be connected to a respective one of the power supplying units, and is adapted to generate an alternating current sensor output corresponding to power output of the respective one of the power supplying units.

Each of the rectifying and filtering circuits is connected to a respective one of the sensors, and rectifies and filters the alternating current sensor output of the respective one of the sensors so as to obtain a corresponding direct current sensor output.

The microprocessor is connected to each of the rectifying and filtering circuits, and is adapted to be connected to each of the power supplying units. The microprocessor receives the direct current sensor outputs from the rectifying and filtering circuits, and calculates an average input value of the direct current sensor outputs that corresponds to a balanced power output for the power supplying units. The microprocessor compares each of the direct current sensor outputs with the average input value to determine if one of the direct current sensor outputs is larger than the average input value, indicating a condition in that the power output of one of the power supplying units is higher than the balanced power output. The microprocessor is adapted to generate a load adjustment signal to control said one of the power supplying units so as to decrease the power output of said one of the power supplying units to the balanced power output, thereby enabling each of the power supplying units to supply the balanced power output to the electrical load.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
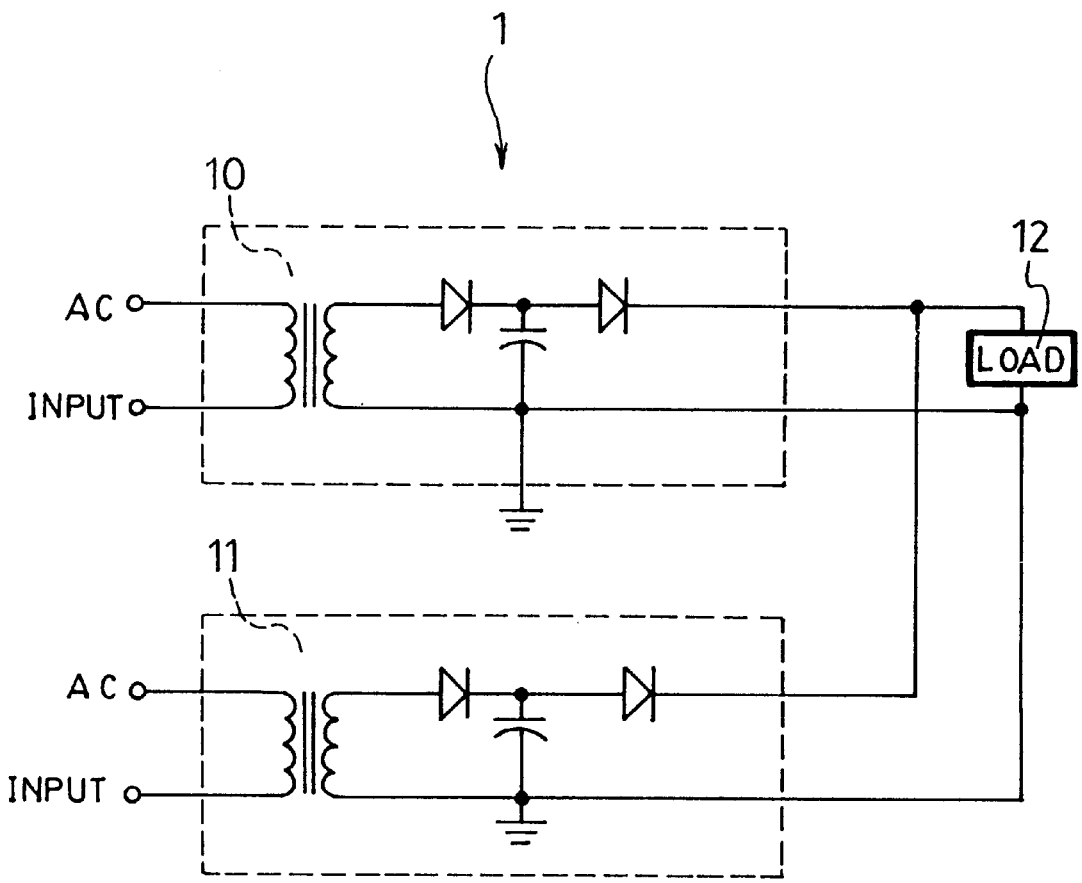
FIG. 1 is a schematic circuit diagram illustrating a conventional power supplying system for an electrical load.
Figure 2:
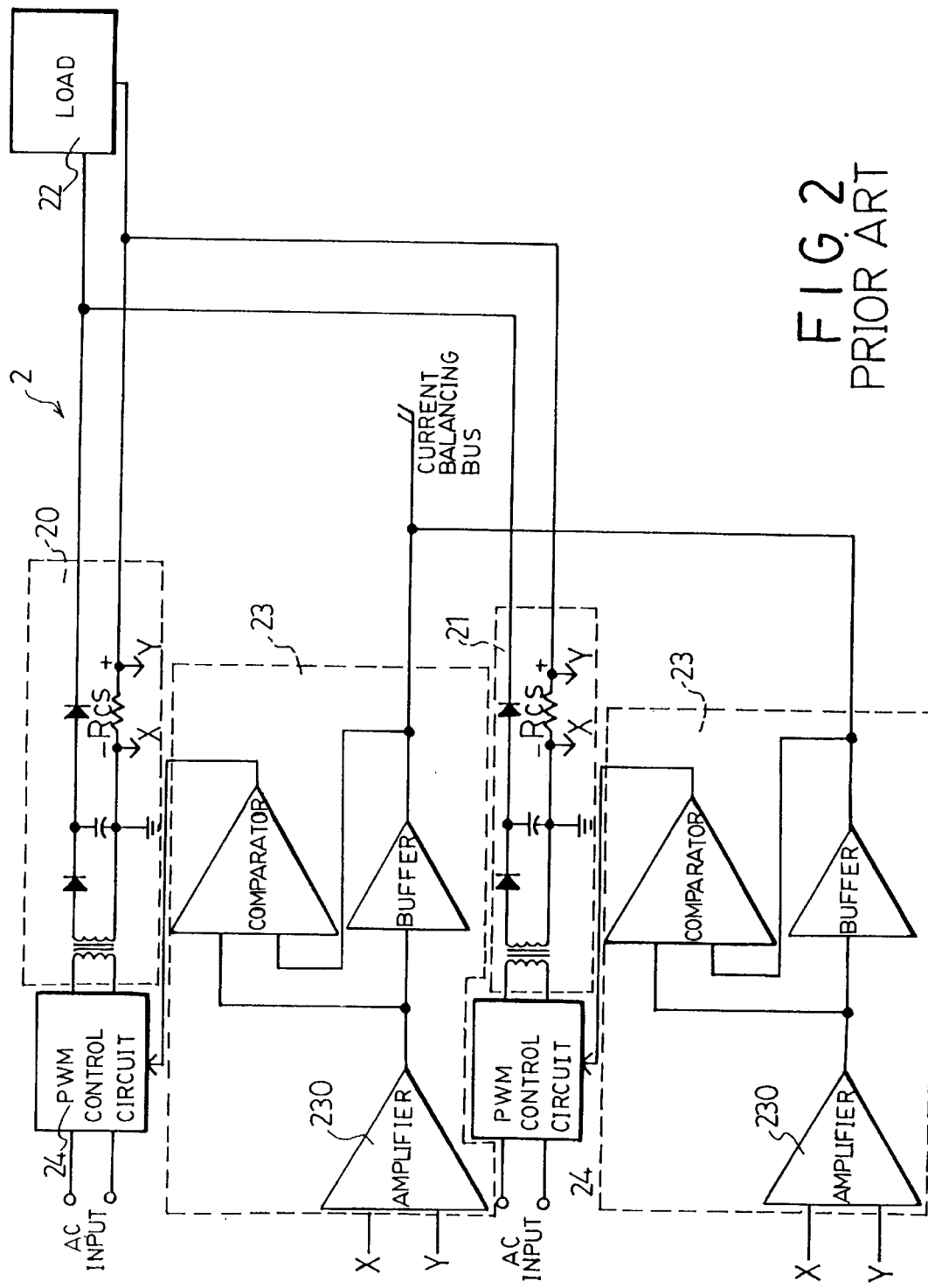
FIG. 2 is a schematic circuit diagram illustrating another conventional power supplying system for an electrical load.
Figure 3:
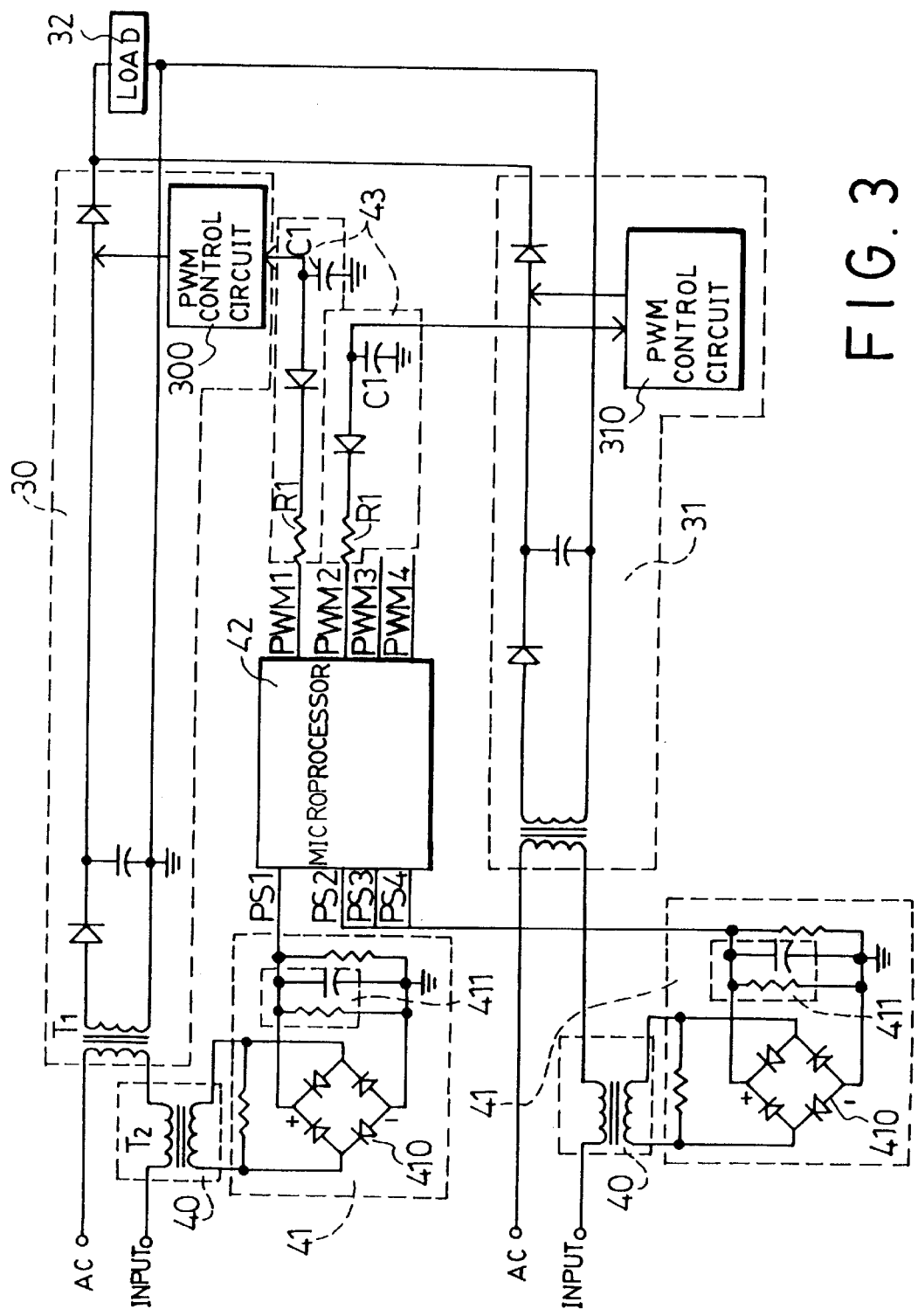
FIG. 3 is a schematic circuit diagram illustrating a power supplying system that incorporates the preferred embodiment of a load balancer according to the present invention.

Referring to FIG. 3, the preferred embodiment of a load balancer according to the present invention is shown to be installed in a power supplying system that provides power to an electrical load 32, such as a desktop computer or a notebook computer. The power supplying system includes at least two power supplying units that are connected in parallel to the electrical load 32. In this embodiment, the power supplying system is shown to include two power supplying units 30, 31. Each of the power supplying units 30, 31 incorporates a pulse width modulation (PWM) control circuit 300, 310 that can be controlled so as to adjust the power output of the corresponding power supplying unit 30, 31 in a known manner. The load balancer includes at least two sensors 40, each of which is connected to a respective one of the power supplying units 30, 31, at least two rectifying and filtering circuits 41, each of which is connected to a respective one of the sensors 40, a microprocessor 42 connected to each of the rectifying and filtering circuits 41, and at least two delay circuits 43.

Each of the sensors 40 is preferably in the form of a transformer, and generates an alternating current (ac) sensor output corresponding to the power output of the respective one of the power supplying units 30, 31.

Each of the rectifying and filtering circuits 41 includes a bridge rectifier 410 connected to the respective one of the sensors 40 so as to rectify the ac sensor output of the latter to obtain a rectified sensor output, and a filter circuit 411 connected to the bridge rectifier 410 so as to filter the rectified sensor output of the latter to obtain a direct current (dc) sensor output.

In this embodiment, the microprocessor 42 has four input pins (PS1–PS4) adapted to be connected to the filter circuits 411 of up to four rectifying and filtering circuits 41, and four output pins (PWM1–PWM4) adapted to control the PWM control circuits of up to four power supplying units. The microprocessor 42 receives and converts the dc sensor outputs of the rectifying and filtering circuits 41 into digital sensor outputs, and calculates an average input value of the digital sensor outputs that corresponds to a balanced power output for the power supplying units 30, 31. Thereafter, the microprocessor 42 compares each of the dc sensor outputs with the average input value. When one of the dc sensor outputs is larger than the average input value, indicating a condition in that the power output of one of the power supplying units 30, 31 is higher than the balanced power output, the microprocessor 42 generates a load adjustment signal at a corresponding one of the output pins (PWM1–PWM4) to control the PWM control circuit 300, 310 of the power supplying unit 30, 31 with the higher power output so as to decrease the power output. At the same time, the power output of the other power supplying unit 30, 31 will increase simultaneously until a balanced load condition is achieved for the power supplying units 30, 31.

Each of the delay circuits 43 connects a respective one of the output pins (PWM1–PWM4) of the microprocessor 42 and the PWM control circuit 300, 310 of a respective one of the power supplying units 30, 31. Each of the delay circuits 43 includes a resistor (R1) and a capacitor (C1). The effect of the delay circuit 43 is to add a delay to the load adjustment signal from the microprocessor 42 prior to reception of the same by the PWM control circuit 300, 310 of the respective power supplying unit 30, 31 so that load adjustment can be conducted smoothly.

In the following example, it is assumed that the power supplying units 30, 31 initially provide power outputs of 80 watts and 20 watts, respectively, to a 100-watt electrical load 32. The load balancer of the preferred embodiment operates as follows:

1. Each sensor 40 generates the ac sensor output corresponding to the power output of the respective power supplying unit 30, 31. Each rectifying and filtering circuit 41 rectifies and filters the ac sensor output of the respective sensor 40 so as to obtain the corresponding dc sensor output. The microprocessor 42 receives the dc sensor outputs from the rectifying and filtering circuits 41.

2. The microprocessor 42 processes the dc sensor outputs of the rectifying and filtering circuits 41, and calculates an average input value corresponding to a balanced power output, e.g. 50 watts, for the power supplying units 30, 31.

3. The microprocessor 42 compares each of the dc sensor outputs with the average input value. Since the power output of the power supplying unit 30 is higher than the balanced power output, the dc sensor output corresponding thereto is larger than the average input value. The microprocessor 42 then generates a load adjustment signal at the output pin (PWM1) to control the PWM control circuit 300 of the power supplying unit 30 so as to decrease the power output of the latter. The power output of the power supplying unit 31 increases simultaneously at this time.

4. Steps 2 and 3 are repeated until a balanced load condition is achieved for the power supplying units 30, 31.

The preferred embodiment is illustrated hereinabove in terms of a power supplying system that includes two power supplying units 30, 31. In practice, regardless of whether the power supplying system incorporates two, three or four power supplying units, as long as the power output of one of the power supplying units exceeds the balanced power output, said one of the power supplying units will be controlled so as to decrease the power output of the same to the balanced power output, thereby enabling each of the power supplying units to supply the balanced power output to the electrical load.

The load balancer of this invention has the following advantages:

1. Each comparing and load adjusting operation of the microprocessor 42 is performed after the average input value has been calculated. Load balancing can thus be achieved to prolong the service life of the power supplying units 30, 31, and increase the reliability and stability of the power supplying system.
2. The sensors 40, which have better linearity, are employed instead of the resistors (RCS) to detect the power outputs of the power supplying units 30, 31. In addition, unlike the resistors (RCS), the sensors 40 are not easily affected by ambient temperature.
3. The presence of the delay circuits 43 ensures that load adjustment can be conducted smoothly.
4. Load adjustment is performed by decreasing the power output of the power supplying unit 30, 31 that initially provides a higher power output as compared to the other power supplying unit 30, 31. The load adjustment as such can effectively prevent the occurrence of overvoltage at the output of the power supplying system that can lead to damage to internal components of the electrical load 32 in the event of abnormal operating conditions.
5. The microprocessor 42 facilitates an expansion in the number of power supplying units 30, 31 that constitute the power supplying system.
6. Because the microprocessor 42 calculates the average input value from the dc sensor inputs thereto, the effect of noise during load adjustment of the power supplying units 30, 31 can be minimized to avoid erroneous operation of the power supplying system.
7. The load balancer can be easily modified to incorporate a pre-fail detection capability. Thus, in the event of an overload or an abnormal operating condition, the load balancer can be controlled to perform an appropriate action, such as generating an alarm or shutting down the system, in order to protect the electrical load 32.
8. As compared to the aforementioned prior art, the use of the microprocessor-based load balancer of the present invention in a power supplying system results in a simpler construction and in a substantial cost reduction.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

We claim:

1. A load balancer for a power supplying system which includes at least two power supplying units that are connected in parallel to supply power concurrently to operate an electrical load, said load balancer comprising:

at least two sensors, each of which is adapted to be connected to a respective one of the power supplying units, and each of which is adapted to generate an alternating current sensor output corresponding to power output of the respective one of the power supplying units;

at least two rectifying and filtering circuits, each of which is connected to a respective one of said sensors, and each of which rectifies and filters the alternating current sensor output of the respective one of said sensors so as to obtain a corresponding direct current sensor output; and a microprocessor connected to each of said rectifying and filtering circuits and adapted to be connected to each of the power supplying units, said microprocessor receiving the direct current sensor outputs from said rectifying and filtering circuits, and calculating an average input value of the direct current sensor outputs that corresponds to a balanced power output for the power supplying units;

said microprocessor comparing each of the direct current sensor outputs with the average input value to determine if one of the direct current sensor outputs is larger than the average input value, indicating a condition in that the power output of one of the power supplying units is higher than the balanced power output;

said microprocessor being adapted to generate a load adjustment signal to control said one of the power supplying units so as to decrease the power output of said one of the power supplying units to the balanced power output, thereby enabling each of the power supplying units to supply the balanced power output to the electrical load.

2. The load balancer as claimed in claim 1, further comprising at least two delay circuits, each of which is adapted to connect said microprocessor and a respective one of the power supplying units so as to add a delay to the load adjustment signal from said microprocessor prior to reception by said one of the power supplying units.

3. The load balancer as claimed in claim 1, wherein each of said sensors includes a transformer.

* * * * *